Dec. 25, 1934.  W. W. MACALPINE  1,985,735
ELECTRICAL GENERATOR SYSTEM
Filed Nov. 10, 1931
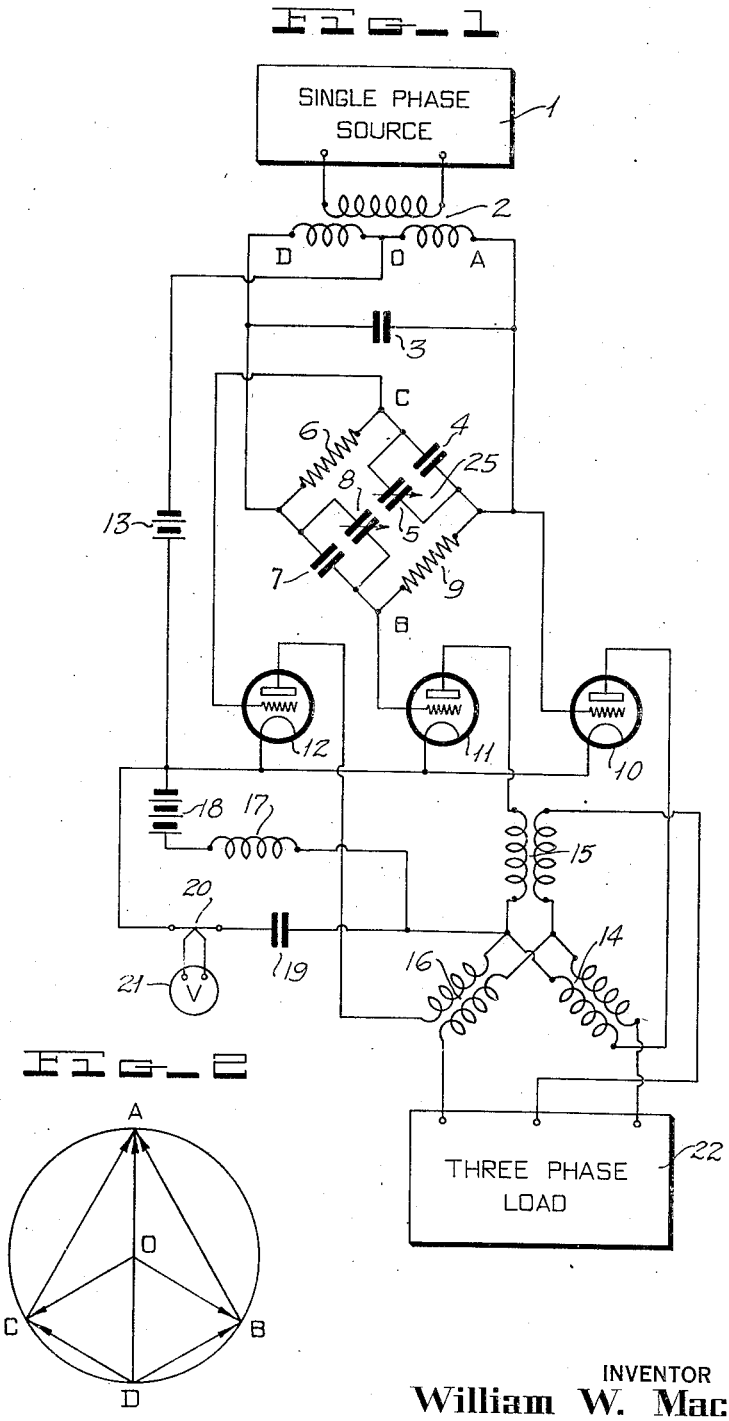
INVENTOR
William W. Macalpine
BY
ATTORNEY Patented Dec. 25, 1934

1,985,735

UNITED STATES PATENT OFFICE 1,985,735

ELECTRICAL GENERATOR SYSTEM

William Walter Macalpine, East Orange, N. J., assignor to Communication Patents, Inc., New York, N. Y., a corporation of Delaware Application November 10, 1931, Serial No. 574,072

12 Claims. (Cl. 172—238)

This invention relates to systems for generating polyphase voltages and currents, and particularly to systems for obtaining these voltages from single phase currents.

There are various communication systems wherein the use of polyphase currents is desirable, especially those having a plurality of channels. For instance, in the transmission of entertainment programs by carrier current over the commercial power distribution network of a city, the transmission is considerably improved by the use of three phase carrier currents applied to the three phase power network. Polyphase currents can also be used for the transmission of several programs or messages simultaneously over the same channel. They also may be used in moderate and high frequency circuits related to communication systems, such as for measuring and test circuits.

The present invention contemplates the production of two, three or polyphase voltages of higher order from single phase currents, the latter being generated by any of several methods well known in the art. The method and means for accomplishing this result possess certain advantages over former systems devised for this purpose.

An object of this invention is to generate polyphase voltages and currents.

Another object of this invention is to produce polyphase voltages whose several amplitudes are all mutually equal regardless of the phase angles between the voltages, or their frequency.

A further object of this invention is to generate polyphase voltages with apparatus and circuits signalized by their simplicity and stability.

A still further object of this invention is to provide a meter indicating the equality of the various phase angles to facilitate the adjustment of the phase angles to equality.

Other objects and certain advantages of this invention will be obvious from the following description when read in conjunction with the accompanying drawing, in which:

Fig. 1 is a schematic drawing of an embodiment of the invention for the production of three phase voltages and currents from single phase energy.

Fig. 2 is a vector diagram illustrating the geometry upon which the invention is based.

Referring specifically to Fig. 1, a single phase current is supplied by an oscillator or other source 1 to a transformer 2, whose secondary has a mid tap at point O. The transformer 2 may be tuned by a condenser 3 if desired. The secondary of transformer 2 supplies a phase divider 25 having two arms, one composed of two parallel condensers 4 and 5 in series with a resistance 6, and the other of two parallel condensers 7 and 8 in series with a resistance 9. The condensers 5 and 8 are small trimming condensers to aid the balancing of the respective arms. Three vacuum tubes 10, 11, 12, whose filament or heater supply sources are not shown, have their filaments or cathodes connected together and connected to the midpoint O of the secondary of transformer 2 through a grid bias battery 13. The grid of tube 10 is connected to point A at one end of the secondary of transformer 2, while the grids of tubes 11 and 12 are connected to points B and C, respectively, of the phase divider 25.

Tubes 10, 11, 12 have, in their plate circuits, the primaries of transformers 14, 15, 16, respectively, these windings being Y connected. The return from the neutral point of these windings is divided into two branches, one being a direct current branch composed of a choke 17 and a plate battery 18 and the other an alternating current branch including a bypass condenser 19 in series with a suitable alternating current measuring instrument here represented as a hot wire thermocouple 20 and millivoltmeter 21. The secondaries of transformers 14, 15, 16 are shown connected in Y to a three phase load 22. The nature of this load may be any typical type such as three amplifying tubes used as a three phase amplifier, or a three phase transmission line.

The secondaries of transformers 14, 15, 16 may be connected in delta instead of Y if desired. Or they could be connected in double delta or double Y to obtain six phase, this requiring two equal secondaries on each transformer. Furthermore, any other connection of these transformers may be made without departing from the spirit of the invention. Various other means of coupling the tubes 10, 11, 12 to load 22 could be utilized such as a resistance-capacity coupling.

The operation of the system will be better understood by reference to Fig. 2 which is a vector diagram of the voltages appearing in the secondary of transformer 2 and in the phase divider 25. The vector AD in Fig. 2 is the voltage appearing between the terminals A and D of transformer 2, O representing the mid-point.

AB represents the voltage drop across resistance element 9 and BD that across condensers 7 and 8 in parallel. Because of the nature of these circuit elements, it is well known that angle ABD will be a right angle, and so point B will lie on the circumference of a circle having a diameter AD with its center at O. Similarly AC represents the voltage across condensers 4 and 5 and CD that across resistance 6, and, therefore, point C will lie on the circumference of the circle with its center at O and diameter AD. It is then evident that the vectors OA, OB, and OC are of equal length irrespective of their relative phase angles or of changes in size of the figure due to influences acting on the amplitude of the voltage AD.

These three voltages OA, OB, and OC, are the three phase voltages applied to the grids of tubes 10, 11, 12, respectively, and these voltages are all mutually equal regardless of their phase angles. Now with three matched tubes 10, 11, 12, a balanced load and the transformers 14, 15, 16 substantially equal, the output voltages and currents are mutually equal regardless of their phase angles.

The phase angles may be accurately set by calibrating the condensers 4, 5, 7, 8 and resistances 6, 9, and measuring the frequency. Then for 120° phases or three phase generation:

$$R_6 = \frac{1}{\sqrt{3}\, 2\pi f(C_4+C_5)}$$

and $$R_9 = \sqrt{3}\, \frac{1}{2\pi f(C_7+C_8)}$$

As a check on the phases the neutral return current may be measured by the meter 20, 21. All phase voltages being equal, the return current will be zero when the phases are 120° apart. No other phase angles will give zero return current.

The vector diagram of Fig. 2 is based on the assumption that the grids of tubes 10, 11, 12, draw negligible current. This condition exists at frequencies such as usually employed in carrier frequency work. At high frequencies it may be desirable however, to use screen grid tubes instead of the three element tubes, 10, 11 and 12. The system may be operated at moderately high power by proper choice of the elements of the phase divider circuit.

The system is not critical in adjustment or sensitive to changes in frequency or in the value of the resistors or capacitors of the phase divider, providing an extremely stable polyphase generator. For instance, the phase angle of any phase changes only ½° for every 1% change in frequency or in the resistance or capacity of the corresponding phase divider arm.

It is evident that corresponding systems may be used for any number of phases, in which case there would be $n-1$ arms in the phase divider.

What is claimed is:

1. In a three phase electrical generator system, a single phase source, a transformer in the output circuit of said source having a tapped secondary winding, a bridge circuit having impedance arms, means for impressing the total voltage across said secondary winding between opposite points of said bridge circuit, and means connected to said tapped secondary winding and said bridge circuit on which voltages having a substantially equal value and any desired phase difference are impressed.

2. In a three phase generating system, a bridge circuit having impedance arms, said arms including a plurality of reactances and a plurality of resistances in series, means for impressing a single phase voltage source on said bridge arms at opposite input terminal points, a three phase voltage circuit, and means for connecting said circuit to two points on said bridge circuit intermediate said opposite input terminal points and to one of said opposite input terminal points, the voltages of each phase being substantially independent of phase differences.

3. In a three phase generating system, a single phase source of energy, a transformer in the output circuit of said source having a secondary winding tapped at its mid-point, three vacuum tubes, a common cathode circuit for said tubes, means for connecting the mid-point of said secondary winding to the common cathode circuit of said vacuum tubes, means for connecting one end terminal of said secondary winding to the input circuit of one of said tubes, means connected between the end terminals of said secondary winding for shifting the phase of said secondary winding voltage an equal amount in either direction from that at one end terminal thereof, and means for connecting the input circuits of the remaining vacuum tubes to intermediate terminals of said phase shifting means, said means maintaining substantially equal voltages for said phases regardless of phase differences between them.

4. In a three phase generating system, a single phase source of energy, a transformer in the output circuit of said source having a secondary winding with two end terminals and a mid-tap, a bridge circuit comprising two arms, the first arm composed of a resistance and a capacitance in series across the two end terminals of said secondary and the second arm composed of a capacitance and a resistance in series across said two end terminals, three vacuum tubes, means for connecting the cathode circuits of said vacuum tubes to the mid-point of said secondary winding, means for connecting one end terminal of said secondary winding to the grid circuit of one of said vacuum tubes, and means for connecting the junctions between the capacitance and resistance of each of said two bridge arms to the input circuits of the remaining two of said vacuum tubes, respectively, said circuit maintaining the voltages of said phases substantially equal regardless of phase shifts between them.

5. In a polyphase electrical generator, a source of single phase energy, a transformer in the output circuit of said source having a mid-tapped secondary winding, an adjustable phase determining network across the two end terminals of said secondary winding, a plurality of vacuum tubes having input and output circuits, respectively, said output circuits having a common return path to the cathodes of said vacuum tubes, means for connecting the cathodes of said tubes to the mid-tap of said secondary winding, means for connecting the input circuits of said tubes, respectively, to points on said network to impress equal voltages of different phase on the input circuits of said tubes, and means in said common return path to the cathodes for measuring the alternating current component of the current flowing in said return path, a zero reading of said measuring means indicating the phase relationship between the several voltages.

6. In a plural phase electrical generating system, a single phase source, an impedance element in the output circuit of said source, a bridge circuit having a plurality of arms, means for impressing the total voltage across said impedance element between opposite points of said voltage circuit, means connected to said impedance element and said bridge circuit for indicating the phase relationship between the several voltages produced by said bridge circuit and impedance element.

7. In a plural phase electrical generating system, a single phase source, an impedance element having two terminal points and an intermediate point, a bridge element having a plurality of impedance arms, means for connecting the terminal points of said impedance between opposite points of said bridge circuit, and a plurality of substantially voltage actuated devices each of which is connected to a point on said bridge circuit with a common connection to said intermediate point of said impedance.

8. In a polyphase electrical generator, a source of single phase energy, a plurality of substantially voltage responsive devices, an impedance element connected in the output circuit of said single phase source having terminal points and an intermediate point, a bridge circuit, means connecting said terminal points and the opposite points of said bridge circuit, and means connecting points intermediate said opposite points to certain of said plurality of voltage responsive devices and connecting one of said opposite points to another of said voltage responsive devices for impressing on the input thereof voltages of substantially equal value and any desired phase differences.

9. In a plural phase generating system, a bridge circuit having impedance arms, said arms including two reactances and two resistances in series, means for impressing a single phase voltage on said bridge arms at opposite input terminal points thereon, a plural phase voltage circuit, means for connecting said circuit to two points on said bridge circuit intermediate said opposite input terminal points and to one of said opposite input terminal points, and means included in said last mentioned connection for indicating the phase relationship between the several voltages.

10. In an electrical converter system, a source of alternating voltage, a tapped impedance in the output circuit of said source, a bridge circuit having a plurality of arms, means for impressing the total voltage of said source across said impedance between opposite points of said bridge circuit, and means connected to said impedance and said bridge circuit on which voltages having a substantially equal value and any desired phase difference are impressed.

11. A plural phase converter system, a bridge circuit having impedance arms, said arms including a plurality of reactances and a plurality of resistances in series, means for impressing an alternating voltage on said bridge arms at opposite input terminal points thereof, a plural phase voltage circuit, and means for connecting said circuit to two points on said bridge circuit intermediate said opposite input terminal points and to one of said opposite input terminal points.

12. In an electrical converter system, an alternating voltage source, a tapped impedance, a bridge circuit having impedance arms, said arms including a plurality of reactances and a plurality of resistances in series, means for impressing said alternating voltage on said bridge arms at opposite input terminals thereof, voltage responsive devices, and means for connecting said voltage responsive devices to two points on said bridge circuit intermediate said opposite terminal points, to one of said opposite terminal points, and to said tap of said impedance.

WILLIAM W. MACALPINE.